United States Patent [19]

Needham et al.

[11] 4,231,428

[45] Nov. 4, 1980

[54] WELL TREATMENT METHOD

[75] Inventors: Riley B. Needham; Charles P. Thomas; Donald R. Wier, all of Bartlesville, Okla.

[73] Assignee: Phillips Petroleum Company, Bartlesville, Okla.

[21] Appl. No.: 966,458

[22] Filed: Dec. 4, 1978

[51] Int. Cl.$^2$ ............................................. E21B 43/26
[52] U.S. Cl. ................................................... 166/280
[58] Field of Search ............... 166/280, 271, 276, 278, 166/308; 427/219

[56] References Cited

U.S. PATENT DOCUMENTS

| | | | |
|---|---|---|---|
| 1,855,210 | 4/1928 | Walton | 427/219 X |
| 2,927,045 | 3/1960 | Lodge et al. | 427/219 |
| 3,026,938 | 3/1962 | Huitt et al. | 166/280 |
| 3,032,499 | 5/1962 | Brown | 166/305 R |
| 3,237,693 | 3/1966 | Huitt et al. | 166/280 |
| 3,929,191 | 12/1975 | Graham et al. | 166/280 X |
| 4,034,139 | 7/1977 | Mazarguil et al. | 427/219 X |
| 4,042,032 | 8/1977 | Anderson et al. | 166/276 |
| 4,068,718 | 1/1978 | Cooke, Jr. et al. | 166/280 |
| 4,078,610 | 3/1978 | Arnold | 166/280 |

*Primary Examiner*—Stephen J. Novosad
*Assistant Examiner*—George A. Suchfield

[57] ABSTRACT

In a method of propping a fracture in subterranean formations, the invention comprises placing in the fractures particulate solids such as sand coated with a water-repellent coating composition such as an oil-soluble organo-silicon compound. The water-repellent coated solid particulate propping agent can be prepared by dissolving an oil-soluble organo-silicon compound in a solvent therefor, admixing the resultant solution with particulate material, and thereafter evaporating the solvent to form a coating of organo-silicon compound on the particulate material.

8 Claims, No Drawings

WELL TREATMENT METHOD

This invention relates to the treatment of subterranean hydrocarbon-bearing formations. In another aspect, this invention relates to an improved well-treating method which employs particulate material coated with a water-repellent material. In another aspect, this invention relates to an improved particulate material coated with an organo-silicon material for use in hydraulic fracturing. In another aspect, this invention relates to an improved particulate material coated with an oil-soluble organo-silicon material having utility as a proppant in hydraulic fracturing.

Hydraulic fracturing processes have been employed for some time to create artificial fractures adjacent a producing well to increase the productivity of the fluid-bearing formation. In general, such processes consist of forcing a fracturing fluid into a producing well in sufficient volume and under sufficient pressure to rupture the formation. The fracturing fluid is forced to enter the induced cracks and extend the fracture for substantial distances into the formation. After the injection pressure has been released, the fracture produced in the formation tends to close due to the weight of the overburden. In order to keep the fracture open, granular insoluble solids such as sand are usually suspended in the fracturing medium. The granular solids, on being carried into the fracture, act as props and hold open the fracture after the injection pressure is released.

In deep walls, for example, the sand used for propping fractures in wells is at pressures causing the permeability of the fracture to be unsatisfactorily low. The cause of the crushing is the relatively low compressive strength of sand in the presence of water. The present invention relates to the treatment of sand and other particulate solids used as propping agents with a water repellent to reduce the influence of water on the strengths of these propping agents. Thereby the particulate material used as propping agents is made usable for propping fractures at greater depths than is now practical.

Accordingly, an object of this invention is to provide improved propping agents for use in hydraulic fracturing of subterranean formations.

Another object of this invention is to provide particulate material coated with a water repellent useful in hydraulic fracturing of subterranean formations.

A further object of this invention is to coat particulate solids useful as propping agents to increase the strength of the propping agent in the presence of water.

Other objects, aspects, and the several advantages of the invention will be apparent to those skilled in the art upon reading the specification and the appended claims.

In accordance with the invention, a novel propping agent comprising an inert solid particle coated with a water-repellent organo-silicon material is displaced down a well and into a fracture in a subterranean hydrocarbon-bearing formation.

In accordance with a specific embodiment, sand coated with a water-repellent material is prepared by dissolving an oil-soluble organo-silicon compound in a solvent therefor, admixing the resultant solution with sand, and thereafter evaporating the solvent to form a silicon-coated sand which can then be used as a propping medium in fractured formations containing hydrocarbons.

It has been found that in oil wells wherein sand is used as a propping medium in fractured formations containing hydrocarbons wetting of the sand with the water causes the sand to lose compressive strength and thereby be at least partially crushed by the formation. Sand coated with the silicon compound according to the invention is prevented from being water-wetted and therefore maintains its strength, improving its use as a propping agent.

The inert material forming the core of the novel propping agent of this invention can be any of the solid materials conventionally used for propping agents. Sand is widely used as a propping agent and forms a suitable inert core for use in those instances in which the sand is capable of withstanding the crushing forces exerted by the faces of the fracture when the fluid pressure within the fracture is released. When the fracture to be propped is in a hard formation at substantial depths, the inert core preferably is a material that is more resistant to crushing than sand. Suitable inert materials forming the core of the propping agent subjected to such use include ceramic particles, glass spheres, plastic particles, bauxite (aluminum oxide), and the like.

The water-repellent material employed in the method of the present invention to coat inert particulate materials for use as propping agents is an oil-soluble organo-silicon compound. Representative organo-silicon compounds that can be used include polyalkylsiloxanes such as polymethylsiloxanes, polyethylsiloxanes, and the like. Additionally, polyalkylarylsiloxanes such as polymethylphenylsiloxane are also usable as a coating material of the invention. Chlorosilanes such as chlorotrimethylsilane and other silyl donors can also be used, as well as various alkoxysilanes, aroxysilanes, alkoxysiloxanes, and aroxysiloxanes, and the like, as the water-repellent coating of the propping agent. Other organo-silicon oil-soluble compounds which can be used include the ethyl silicates, methyl sodium silanolate, and other silicon resins such as mixtures of silane esters, silyl amines, and the like.

The organo-silicon coating is preferably applied to the particulate propping agent dissolved in a suitable solvent. It is preferred that the solvent used will dissolve the organo-silicon compound and that the organo-silicon compound is readily adsorbed onto the particulate material such as sand from the solvent and that the solvent be easily removed from the particulate material as by drying. Organic solvents that can be used as a carrier for the organo-silicon coating material preferably include hydrocarbons having a boiling point in the range of about 100° F. (38° C.) and about 600° F. (316° C.) such as toluene [b.p. 231° F. (110.6° C.)], xylene [280°–291° F. (138°–144° C.)], hexane [155.7° F. (68.7° C.)], kerosene [350°–525° F. (176°–273° C.)], and lighter grades of diesel fuel [350°–590° F. (176°–310° C.)]. Kerosene and diesel fuel are frequently preferred because of their lower cost.

For use in well treatments, it is preferred that the organo-silicon compound be applied as a coating to a particulate substrate. The particulate material can be coated by dissolving the oil-soluble organo-silicon compound in a suitable organic solvent, preferably a hydrocarbon, mixing the resulting solution with the particulate substrate, and then evaporating the solvent by heating at an elevated temperature up to about 600° F. (315° C.) maximum, preferably at a temperature in the range of from 70° F. (21° C.) to about 400° F. (204° C.). Oxygen should be excluded when the higher temperatures are used for evaporating the solvent. The final product is a composite material consisting of a substrate and an encapsulating coating of organo-silicon compound.

Propping agents used in hydraulic fracturing normally range in particle size from about 8 to about 60 mesh, with the most common range being between 20 and 40 mesh. Sand is by far the most common propping agent currently used because of its low cost and great abundance. However, under certain conditions, light strength glass beads, as well as bauxite (aluminum oxide), or other propping agents can be used.

In carrying out the fracturing method, a fracture is first generated by injecting a viscous fluid into the formation at a sufficient rate and pressure to cause the formation to fail in tension. Such stresses normally are such to result in a vertical fracture. Injection of the fluid is continued until a fracture of the desired geometry is obtained. Carrier fluid, preferably an aqueous fluid such as salt water or a hydrocarbon liquid such as diesel fuel, having the proppant coated with organo-silicon compound suspended therein is then pumped into the fracture. The carrier fluid bleeds off into the formation and deposits the propping agent in the fracture. After the proppant is placed, the well is closed in with the injection pressure being maintained on the formation. As the pressure within the fracture approaches the normal formation pressure, the fracture walls close on the proppant and apply an overburden stress thereto.

SPECIFIC EXAMPLE

Samples of treated and untreated sand both 20-30 mesh were tested to determine the effect of causing under load at high temperature.

A 1,000-gram sample of treated sand was prepared by dissolving 100 milliliters of Dri-film 104, which is a polyalkylsiloxane sold by General Electric Co. of Schenectady, New York, in one gallon of toluene. The solution was added to the sand in a 4-liter beaker and the mixture stirred for about eight hours. The solution was decanted off the sand, and the sand was spread out to dry in air for four hours. The dried sand was placed in a 4-liter beaker and heated in a vacuum oven at 204° C. (401° F.) for two hours.

Samples of treated or untreated sand were saturated with water and placed in a steel cylinder fitted with an external heater and a plunger. Loads of 7,500 p.s.i. and 10,000 p.s.i. were maintained on the samples while heated in a range between 180° F. (82° C.) and 275° F. (135° C.). After the load was removed, the samples were cooled and dried. The sand was then screened to measure the amount of crushing that occurred. The following table summarizes the tests. As can be seen from the table, the treated sand had less average volume of fines and larger average diameter of particles. The treated sand would provide greater permeability in a fractured formation due to the larger particle size and lower volume of fines.

We claim:

1. In a method of fracturing an underground zone or formation in oil and gas wells, the steps of
   (a) injecting into a well a fracturing fluid to form a fracture in said formation,
   (b) injecting into said formation a carrier fluid having suspended therein a proppant composed of particles coated with an organo-silicon compound prepared by dissolving the organo-silicon compound in a solvent therefor, admixing the resultant solution with particulate material, and thereafter evaporating the solvent to form a silicon-coated particulate material, and
   (c) closing the well and maintaining the injection pressure on the formation until the fracture approaches the normal formation pressure.

2. A method according to claim 1 wherein said particulate material comprises sand, said solvent is a hydrocarbon in which said organo-silicon compound is soluble, and said solvent is evaporated by heating the admixture at an elevated temperature in the range of about 70°-400° F.

3. A method according to claim 1 wherein said particles comprise glass beads or bauxite (aluminum oxide).

4. A method according to claim 1 wherein said organo-silicon compound is polymethylsiloxane, said particulate material comprises sand, said solvent is diesel fuel, and said solvent is evaporated from said admixture by heating at an elevated temperature of about 400° F.

5. A method of treating fractured earthen formations in oil and gas wells comprising the steps of
   (a) mixing together a quantity of particulate solids suitable for use as propping agents and a quantity of an oil-soluble organo-silicon compound dissolved in a solvent and heating the resulting mixture to a temperature sufficient to evaporate said solvent and leave said solids coated with an oil-wettable coating of said organo-silicon compound,
   (b) dispersing said coated particulate solids into a carrying fluid,
   (c) introducing said carrying fluid and dispersed coated solids into a well penetrating a subterranean formation containing fractures, and
   (d) applying pressure to the fluid in the well thereby causing the fluid to contact the earthen formation and to be injected into fractures and openings extending into the formation whereby said coated particles are deposited therein.

6. A method according to claim 5 wherein said particles comprise sand, said solvent is a hydrocarbon in which said organo-silicon compound is soluble, and said elevated temperature is in the range of about 70°-600° F.

7. A method according to claim 5 wherein said particles comprise glass beads or bauxite (aluminum oxide).

8. A method according to claim 5 wherein said organo-silicon compound is polymethylsiloxane, said particles comprise sand, said solvent is a diesel fuel, and said elevated temperature is about 400° F.

TABLE

| Number of Tests Run in Each Series | Condition of Sand | Pressure, P.S.I. | Temperature, °F. (°C.) | Time Period | Average Wt. % of Fines, (Less than 15 microns) | Average Diameter of Sand Where 80 Wt. % is Larger in mm |
| --- | --- | --- | --- | --- | --- | --- |
| 5 | Untreated | 10,000 | 180 (82) | ½-2 Hrs. | 13.4 | 0.22 |
| 5 | Treated | 10,000 | 180 (82) | ½-2 Hrs. | 11.7 | 0.25 |
| 2 | Untreated | 10,000 | 180-275 (82-135) | 24 Hrs. | 18.3 | 0.22 |
| 2 | Treated | 10,000 | 180-275 (82-135) | 24 Hrs. | 15.0 | 0.25 |
| 1 | Untreated | 7,500 | 180 (82) | 2 Hrs. | 6.2 | 0.38 |
| 1 | Treated | 7,500 | 180 (82) | 2 Hrs. | 5.5 | 0.41 |

* * * * *